United States Patent

Alam

[19]

[11] Patent Number: 5,956,422
[45] Date of Patent: *Sep. 21, 1999

[54] PROCESSOR BASED METHOD FOR EXTRACTING TABLETS FROM PRINTED DOCUMENTS

[75] Inventor: Hassan Alam, San Jose, Calif.

[73] Assignee: BCL Computers, Inc., San Jose, Calif.

[*] Notice: This patent is subject to a terminal disclaimer.

[21] Appl. No.: 09/010,394

[22] Filed: Feb. 21, 1998

Related U.S. Application Data

[63] Continuation of application No. 08/546,186, Oct. 20, 1995, Pat. No. 5,737,442.

[51] Int. Cl.$^6$ .............................. G06K 9/00; G06K 9/34; G06K 9/46; G06K 9/66
[52] U.S. Cl. ..................... 382/181; 382/175; 382/286; 382/193; 382/194; 382/197; 382/202
[58] Field of Search .................................. 382/181, 171, 382/173, 174, 175, 176, 180, 286, 291, 295, 305, 306, 193, 194, 197, 199, 202

[56] References Cited

U.S. PATENT DOCUMENTS

| | | | |
|---|---|---|---|
| 4,504,969 | 3/1985 | Suzuki et al. | 382/10 |
| 5,075,895 | 12/1991 | Bessho | 382/61 |
| 5,091,964 | 2/1992 | Shimomura | 382/9 |
| 5,119,437 | 6/1992 | Kuwamura et al. | 382/9 |
| 5,191,612 | 3/1993 | Katsuyama et al. | 382/9 |
| 5,235,653 | 8/1993 | Nakano et al. | 382/61 |
| 5,384,864 | 1/1995 | Spitz | 382/9 |
| 5,428,692 | 6/1995 | Kuehl | 382/204 |
| 5,438,630 | 8/1995 | Chen et al. | 382/159 |
| 5,441,309 | 8/1995 | D'Alessio et al. | 283/58 |
| 5,485,566 | 1/1996 | Rahgozar | 395/148 |
| 5,572,601 | 11/1996 | Bloomberg | 382/175 |
| 5,737,442 | 4/1998 | Alam | 382/181 |

OTHER PUBLICATIONS

Howaldt, K., Maderlechner, G., Scherl, W. "Structural Interpretation of Tables in Scanned Office Documents," 6th Scandinavian Conference on Image Analysis, pp. 839–842, 1989.

Kojima, H., Akiyama, T., "Table Recognition for Automated Document Entry System." SPIE vol. 1384, High Speed Inspection Architectures, Barcoding, and Character Recognition, pp. 285–292, 1990.

Laurentini, A. and Viada, P. "Identifying and Understanding Tabular Material in Compound Documents," Proceedings of the Intl. Conf. on Pattern Recognition, pp. 405–409, 1992.

Balasubramanian S., Chandran S., Arias J., Kasturi R., Chhabra, A., "Information Extraction From Tabular Drawings," Proc. SPIE Document Recognition, pp. 152–163, 1994.

Douglas S., Hurst M., Quinn D., "Using Nastural Language Processing for Identifying and Interpreting Tables in Plain Text," Fourth Annual Symposium on Document Analysis and Information Retrieval, pp. 535–546.

(List continued on next page.)

*Primary Examiner*—Bipin H. Shalwala
*Attorney, Agent, or Firm*—Donald E. Schreiber

[57] ABSTRACT

A processor based method for recognizing, capturing and storing tabular data receives digital-computer data representing a document either as a pixel-format document-image, or as formatted text. Within the digital computer, either form of the digital-computer data is processed to locate tabular data present therein. After a table has been located, tabular data is extracted from cells present in either form of the digital-computer data. The extracted tabular data is stored into a database present on the digital computer.

16 Claims, 7 Drawing Sheets

Microfiche Appendix Included
(3 Microfiche, 118 Pages)

OTHER PUBLICATIONS

Rahgozar M., Zhigang F. Rainero E., "Tabular Document Recognition," Proc. SPIE Document Recognition, pp. 87–96, 1994.

Nagy, G. and Seth, S., "Hierarchical Representation of Optically Scanned Documents," Proceedings of 7th Int. Conf. on Pattern Recognition, pp. 347–349, 1984.

Fletcher, L.A. and Rangachar, K., "A Robust Algorithm for Text String Separation from Mixed Text/Graphics Images," IEEE Transactions on Pattern Analysis and Machine Intelligence, vol. 10, No. 6, pp. 910–918, 1988.

Mahadevan, U. and Nagabushnam, R., "Gap Metrics for Word Separation in Handwritten Lines," Proceedings of the 3rd Intl. Conf. on Document Analysis and Recognition, vol. 1, pp. 124–127, 1995.

Green, E. and Krishnamoorthy, M., "Model–Based analysis of Printed Tables," Proceedings of the Third International Conference on Document Analysis and Recognition, pp. 214–217, 1995.

Hori, Osamu and Doermann, D. S., "Robust Table–Form Structure Analysis Based on Box–Driven Reasoning," Proceedings of the Third International Conference on Document Analysis and Recognition, pp. 218–221, 1995.

Wang, S. and Yagasaki, T., "Block Selection: A Method for Segmenting Page Image of Various Editing Styles," Proceedings of the Third International Conference on Document Analysis and Recognition, pp. 128–133, 1995.

Watanabe, T. and Fukumura, T., "A Framework for Validating Recognized Results in Understanding Table–Form Document Images," Proceedings of the Third International Conference on Document Analysis and Recognition, pp. 536–539 1995.

Srihari, S. and Govindaraju, V., "Analysis of Textual Images Using the Hough Transform," Machine Vision and Applications, vol. 2, No. 3, pp. 141–153, 1989.

Akiyama, T. and Hagita, N., "Automated Entry System for Printed Documents," Pattern Recoignition, vol. 23, No. 11, pp. 1141–1153, 1990.

Table XXXXXXX

| XXXX | XXXX | XXXX | XXXX | <--- C |
| | | | | <--- B |
| XXXX | | | XXXX | <--- C |
| | XXXX | | | <--- S |
| | | | XXXX | <--- S |
| XXXX | | | XXXX | <--- C |

TABLE 1. Void ratio and stress state after consolidation for undrained triaxial compression tests

| | Void ratio (e) | | isotropic consolidation stress p'o (kPa) | |
|---|---|---|---|---|
| 1 | | | | $R_1$ |
| 2 | | | | $R_2$ |
| 3 | 154 | | 154  154 | $R_3$ |
| 4 | | | | $R_4$ |
| 5 | 0.809 | | 384 | $R_5$ |
| 6 | 0.805 | | 550 | $R_6$ |
| 7 | 0.804 | | 350 | $R_7$ |
| 8 | 0.793 | | 348 | $R_8$ |
| 9 | 0.793 | 156 | 475   156 | $R_9$ |
| 10 | 0.791 | | 433 | $R_{10}$ |
| 11 | 0.758 | | 1470 | $R_{11}$ |

168

|← 1 →|← 2 →|← 3 →|

166

PROCESSOR BASED METHOD FOR EXTRACTING TABLETS FROM PRINTED DOCUMENTS

This is a continuation of application Ser. No. 08/546,186 filed Oct. 20, 1995, which issued Apr. 7, 1998, as U.S. Pat. No. 5,737,442.

GOVERNMENT RIGHTS IN PATENT

The U.S. Government has a paid-up license in this invention, and the right in limited circumstances to require the patent owner to license others on reasonable terms as provided for by the terms of ARPA Contract #DAAH01-94-C-R156.

MICROFICHE APPENDIX

Appendix I, consisting of 3 microfiches having a total of 118 frames each, in hereby included herein.

COPYRIGHT NOTICE

A portion of the disclosure of this patent document contains copyrighted material. The copyright owner hereby grants others a right to reproduce copies of the patent document or the patent disclosure exactly as it appears in the files of the United States Patent and Trademark Office, but otherwise reserves all copyright rights whatsoever.

BACKGROUND OF THE INVENTION

1. Field of the Invention

The present invention relates generally to document image processing using digital computers and, more particularly, to optical character recognition which also recognizes, captures and stores tabular data.

2. Description of the Prior Art

Automatic processing of digital data representing an image of a printed document using a digital computer to recognize, capture and/or store information has, for many years, been a subject of active research and commercial products. Thus far, however, such image processing has focused on recognizing, capturing and/or storing texts and even formats present in printed documents. However, in addition to text, many printed documents, particularly financial, scientific and technical documents, contain tabular data. Truly recognizing, capturing and/or storing the entire informational content of such documents necessarily requires capturing more than the format of such tabular data. Rather, truly recognizing, capturing and/or storing such a document's entire informational content requires automatically capturing tabular data in a format suitable for easy computer-based analysis. At present, fully reconstructing the informational content of tables from printed documents in a format suitable for computer-based analysis requires manually re-entering the data from a printed table in a format suitable as input to a database or spreadsheet computer program.

SUMMARY OF THE INVENTION

An object of the present invention is to provide a processor-based method for recognizing, capturing and storing tabular data of a printed document.

Another object of the present invention is to provide a processor based method for recognizing, capturing and storing tabular data presented to a digital computer as a pixel-format document-image.

Another object of the present invention is to provide a processor based method for recognizing, capturing and storing tabular data presented to a digital computer as formatted text.

Another object of the present invention is to provide a processor based method for recognizing, capturing and storing tabular data presented to a digital computer either as a pixel-format document-image or as formatted text.

Briefly, a processor based method for recognizing, capturing and storing tabular data in accordance with the present invention receives digital-computer data representing a printed document either as a pixel-format document-image, or as formatted text. The pixel-format document-image may then either be directly processed to locate tabular data present therein, or the pixel-format document-image may be processed by optical character recognition ("OCR") to obtain formatted text. If the pixel-format document-image is immediately processed after receipt to obtain formatted text prior to locating tabular data, or if formatted text was initially received, such formatted text is processed to locate tabular data.

After locating tabular data either in a received pixel-format document-image or in the formatted text, tabular data is extracted directly from cells present in either form of digital-computer data, or the tabular data located in the pixel-format document-image may first be processed by OCR to obtain formatted text before extracting tabular data. If the tabular data is extracted directly from a pixel-format document-image, then the extracted pixel-format tabular data must be processed by OCR prior to storage into a database. Alternatively, tabular data extracted from formatted text may be stored directly in a database.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 1:
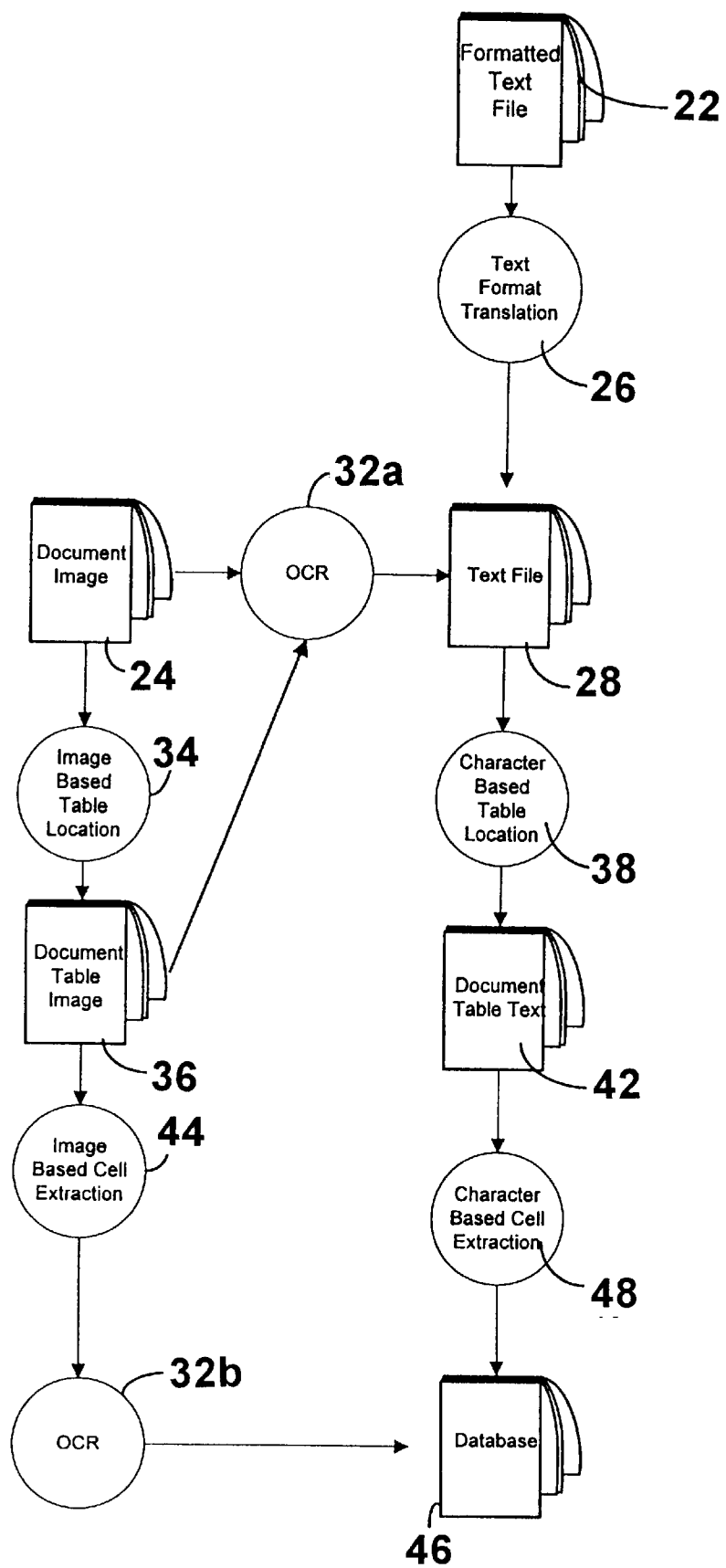
FIG. 1 is a flow diagram depicting the overall method for extracting tabular data from either pixel-format document-images, or from formatted text.

Referring now to FIG. 1, in accordance with the present invention tabular data may be extracted either from a received formatted text 22 or from a received pixel-format document-image 24. The formatted text 22 may, in principle, be in any format from which a printed document may be produced using digital computer technology. However, as explained in greater detail below, it may be necessary to process formatted text 22 with a text-format translation-program 26 to obtain a text file 28 having a standardized format before commencing table extraction. Similarly, the pixel-format document-image 24 may, in principle, be any bit-mapped representation of a printed document obtained initially through sufficiently high-resolution scanning or facsimile of a printed document.

If the printed document is received as the pixel-format document-image 24, it may be immediately processed through OCR 32a to obtain the text file 28. Alternatively, the pixel-format document-image 24 may be processed directly through image-based table-location 34, described in greater detail below, to obtain a document-table image 36 which includes only those portions of pixel-format document-image 24 that appear to contain tabular data. After image-based table-location 34, the document-table image 36 may be processed through OCR 32a to obtain the text file 28 for just the tabular portions of pixel-format document-image 24. Processing the pixel-format document-image 24 first through image-based table-location 34 and then through OCR 32a reduces a possibility that a table dispersing event in OCR 32a may vitiate location of tabular data.

If printed document data is received as the formatted text 22, or if it is converted from a received pixel-format document-image 24 by OCR 32a into text file 28, then the text file 28 is processed through character-based table-location 38, also described in greater detail below, to obtain a document-table text-file 42. The document-table text-file 42 is processed directly through character based cell extraction 48, described in greater detail below to extract tabular data from cells inherently present in the document-table text-file 42. The tabular data extracted from the document-table text-file 42 is then stored into a database 46.

After image-based table-location 34, instead of processing the document-table image 36 through the OCR 32a, the document-table image 36 may be processed directly through image-based cell-extraction 44, described in greater detail below, to extract tabular data cells inherently present in the pixel-format document-image 24. After processing the document-table image 36 through the image-based cell-extraction 44, only those portions of the pixel-format document-image 24 constituting tabular data cells are processed through OCR 32b before the extracted tabular data is stored into the database 46.

As used herein, the term "database" includes also spreadsheets. As is well recognized by those skilled in the art, digital computer data formatted for processing by a database program can be either directly accepted by, or readily re-formatted for processing by a spreadsheet computer program.

Translation of Formatted Text

The formatted text 22 may be received in various different formats, e.g. any one of various different word-processing-program file formats. Prior to performing table extraction on such digital-computer data representing a printed document, the received word-processing-program file is processed through the text-format translation-program 26 to translate the received text into a standard format, preferably ASCII. Presently, text-format-translation programs are commercially available for translating text formatted in virtually any format, e.g. a word-processing-program format, into ASCII.

Accordingly, to simplify table extraction, in general, it is advisable to process received formatted text with a the text-format translation-program 26 prior to commencing extraction of tabular data.

OCR Processing of Pixel-Format Document-Images

Table geometry provides significant semantic demarcation for tabular data. Available OCR computer programs attempt to preserve table geometry present in pixel-format document-images by inserting blank lines and space characters. Thus, OCR processing captures a pixel-format document-image's format, as well as its text. Although the OCR process may not be error free, formatted text produced by OCR provides a sound basis for preliminary analysis of tabular data. Accordingly, OCR may be employed for converting a pixel-format document-image into formatted text prior to the image-based table-location 34 or prior to image-based cell-extraction 44. Moreover, OCR 32b must always be performed on cells containing tabular data extracted by the image-based cell-extraction 44 before the extracted tabular data may be stored into the database 46.

Locating Tabular Data in Pixel-Format Document-Images

In the pixel-format document-image 24 there can exist only three types of table formats:

1. bounded tables in which all table elements are completely enclosed within lines;

2. partially bounded tables in which one or more elements are not completely enclosed within lines; and 3. unbounded tables which contain no lines.

Figure 2A:
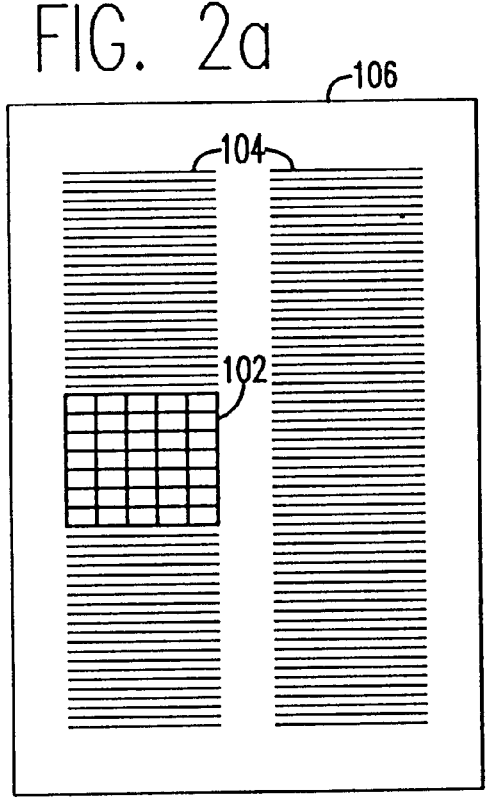
FIGS. 2a–2d are plan views depicting document pages that illustrate various location in which a table may occur within a page.
Figure 2B:
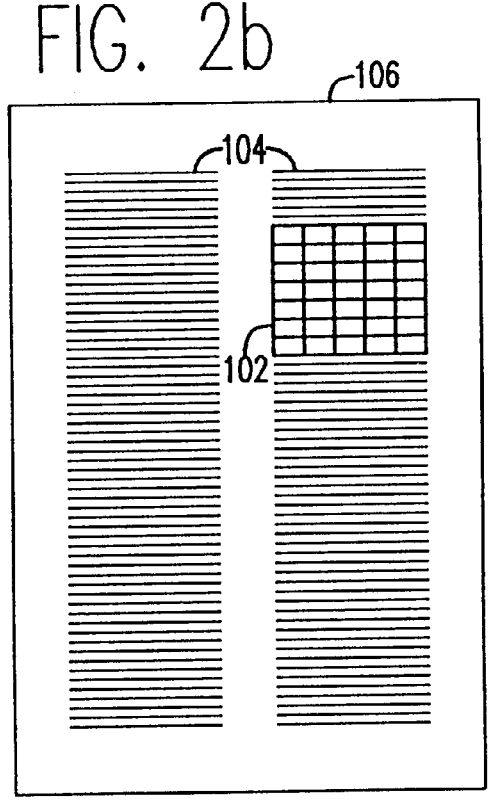
Figure 2C:
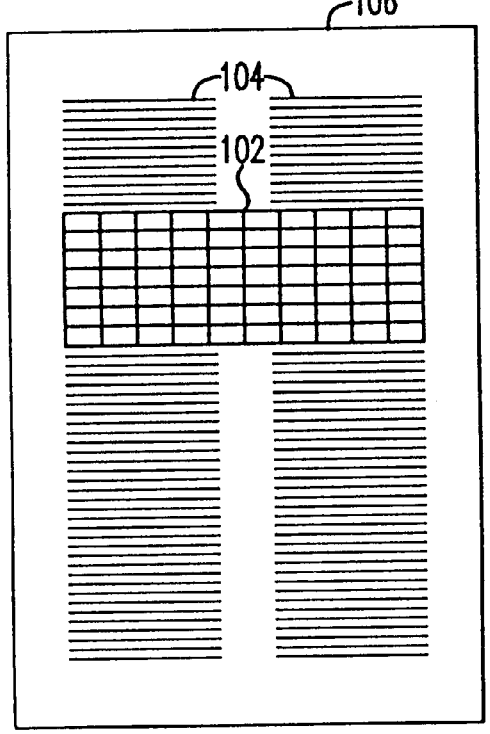
Figure 2D:
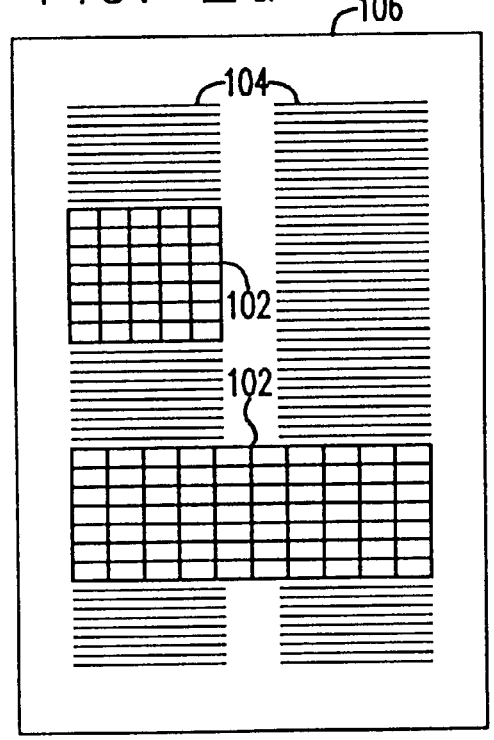

Locating a table in the pixel-format document-image 24 involves differentiating any tables from other elements such as body text, headings, titles, bibliographies, lists, author listings, abstracts, line drawings, and bitmap graphics. FIGS. 2a through 2d depict possible locations for tables 102 among text columns 104 on a printed page 106. The text columns 104 may be embedded within a text column 104 on a multi-column page 106 as illustrated in FIGS. 2a, 2b and 2d. A table 102 may span more than one text column 104 on a multi-column page 106 as illustrated in FIGS. 2c and 2d. And a table 102 may even be embedded in a text column 104 on a page 106 having a table 102 that spans two or more text columns 104 as illustrated in FIG. 2d. Furthermore, a page may contain only tables.

Figure 3:
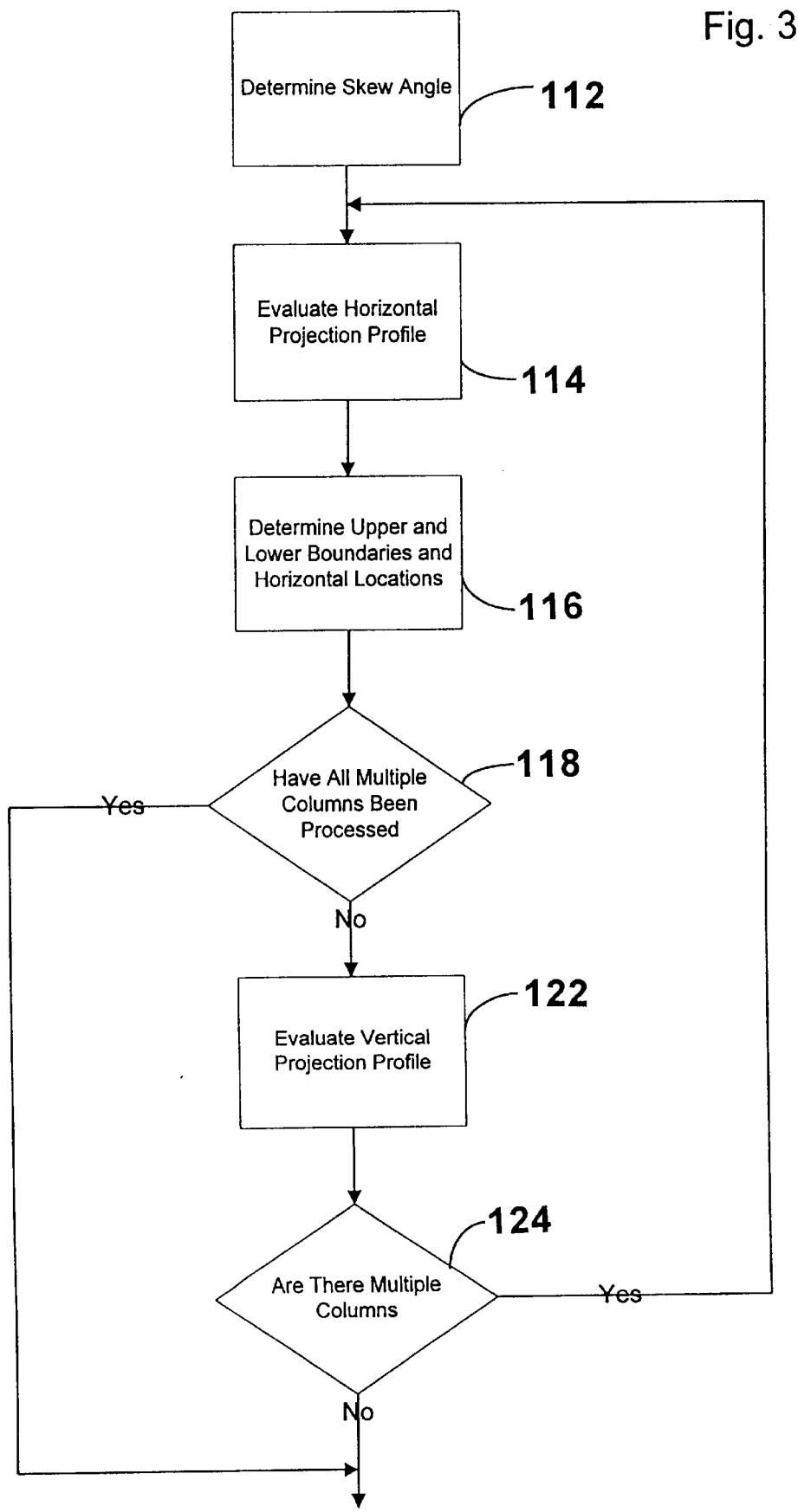
FIG. 3 is a flow diagram depicting processing steps for locating tabular data in pixel-format document-images.

Referring now to the flow chart of FIG. 3, the first step in locating tabular data in a page 106 of the pixel-format document-image 24 is to determine a skew angle as illustrated in processing block 112. Skewed images present a problem for document analysis due to an assumption that text flows across a page parallel to a horizontal axis. The method described in "Analysis of Textual Images Using the Hough Transform," S. Srihari and V. Govindaraju, *Machine Vision and Applications*, vol. 2, pp. 141–153, (1989), incorporated herein by reference, permits determining a skew angle for the pixel-format document-image 24.

Figures 4, 6, 8:
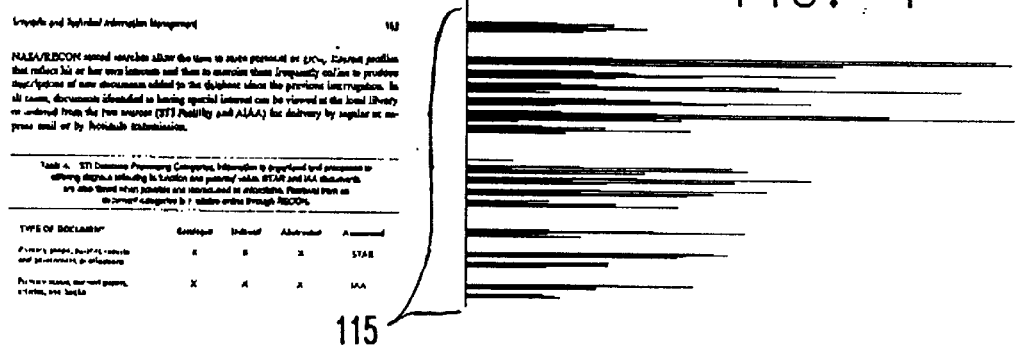
FIG. 4 depicts a horizontal projection profile evaluated for a pixel-format document-image.
FIG. 6 depicts a table having lines of text to which tokens have been assigned.
FIG. 8 depicts plumb lines used in establishing cells in a table which permit in extracting tabular data.

The next step is determining an approximate upper and lower boundary for any table 102 which extends across the page 106 as illustrated in FIGS. 2c and 2d. Identifying the upper and lower boundaries of a table 102 present in the page 106 includes evaluating a horizontal projection profile for white-space on the page 106 as illustrated in processing block 114. As depicted in FIG. 4, a horizontal projection profile 115 transforms two-dimensional unruled tabular data into one-dimensional data. Moreover, using the previously determined skew angle, a horizontal projection profile 115 may be taken of the page 106 at any angle thereby avoiding the need to de-skew the entire page 106 before processing. In evaluating the projection profile in processing block 114 of FIG. 3, it is preferred to use a modification of a recursive X-Y Cut method described in "Hierarchical Representation of Optically Scanned Documents," G. Nagy and S. Seth, *Proceedings of 7th International Conference on Pattern Recognition,* pp. 347–349 (1984), that is incorporated herein by reference.

The horizontal projection profile identifies significant vertically distributed white-space gaps. Vertically spaced white-space gaps appear as a series of zero, or near zero, values in a projection profile vector "P" that is evaluated along each horizontal scan line across the page 106. Since noise and horizontal lines may mask a series of zero values in the projection profile, a projection profile value, $p_j$, for each scan line is evaluated using:

1. a pixel count ($n_j$) that equals the number of black pixels along the scan line;
2. a cross count($c_j$) that equals the number of times the pixel value changes from black to white or from white to black along the scan line; and
3. an extent ($e_j$) that equals the number of pixels between the first and last black pixel along the scan line.

Using the pixel count, the cross count, and the extent, the projection profile value, $p_j$, is determined for each scan line as set forth below.

$$p_j = \min\left[n_j, \frac{c_j^2}{n_j}, \frac{n_j^3}{e_j}\right]$$

If a scan line contains pixels from a horizontal line, or a bar of noise along the left or right margin of the pixel-format document-image 24, then $n_j > c_j$ and, therefore, $c_j^2/n_j$ will be smaller than $n_j$. If a scan line contains "speckled noise", ascenders, or descenders, then generally $\sqrt{e_j} > n_j$, and, therefore, $n_j^3/e_j$ will be smaller than $n_j$. Furthermore, if $p_j$ as evaluated above is below a threshold (t), preferably 5, $p_j$ is set equal to zero.

To find a possible table 102, it is then necessary to identify upper and lower boundary white-space gaps, illustrated in processing block 116, in the horizontal projection profile data using statistical methods. In particular, significant white-space gaps in the vector of projection profile values, i.e.

$$P = (p_1, p_2, \ldots, p_n),$$

are intervals:

1. throughout which the projection profile values, $p_j$, are zero; and
2. which have a width that is k standard deviations above the mean width for all intervals having zero projection profile values, where preferably k=1.5.

Horizontal white-space gaps identified statistically in this way are then analyzed as possible upper or lower table boundaries by determining:

1. if a particular white-space gap belongs to the interior of a sequence of equally spaced white-space gaps; or
2. if a vertical projection profile of the apparent table 102 reveals consecutive vertical regions across the page 106 containing significant white-space gaps, and those vertical white-space gaps cross the particular horizontal white-space gap.

If either of these conditions exist for a particular horizontal white-space gap, then the horizontal white-space gap extends across the interior of a possible table 102, and cannot be part of an upper or lower boundary of a possible table 102. By eliminating those horizontal white-space gaps that satisfy the preceding criteria, the remaining horizontal white-space gaps constitute approximate upper and lower boundaries that may enclose a table 102 present on the page 106.

Regardless of whether the preceding process identifies a table 102, if the page 106 has not been processed for multiple columns as determined in decision block 118, it is necessary to identify upper and lower boundary white-space gaps along vertical scan lines of the page 106 as illustrated in processing block 122. This vertical projection profile merely counts the number of black pixels along each vertical scan line. A vector containing all the vertical projection profile values is then analyzed to determine whether the page contains more than one column.

Assuming that no page 106 of the pixel-format document-image 24 has more than 2 columns and also assuming that white-space between entries in the table 102 is significantly wider than white-space separating text columns 104, the presence of multiple text columns 104 is determined by analyzing a vector "Z" of vertical projection profile values that is evaluated as follows.

1. Determine a width, $z_n$, for each interval of vertical projection profile values that are less than 75% of the maximum vertical projection profile value throughout an interval of at least 5 consecutive vertical projection profile values; and
2. determine a width, $\overline{z}_n$, for each interval of vertical projection profile values in which there does not exist 5 consecutive vertical projection profile values that are less than 75% of the maximum vertical projection profile value. The vector Z then equals $$Z = (z_1, \overline{z}_1, z_2, \overline{z}_2, \ldots, z_n, \overline{z}_n, z_{n+1})$$

A column exists if $$z_j < 30, \text{ for } 2 \leq j \leq n, \text{ and}$$

$$\frac{\min(\overline{z}_j)}{\max(\overline{z}_j)} > 0.9, \text{ for } 1 < j < n.$$

If multiple text columns 104 exist, decision block 124 causes processing of each such text column 104 using horizontal projection profiles in an attempt to identify upper and lower boundaries for additional possible tables 102. In attempting to identify approximate upper and lower boundaries of additional possible tables 102 in the text columns 104, each text column 104 is successively processed in the same way as described above for processing the entire page 106.

In this way, upper and lower boundaries for possible tables 102 that extend across the page 106 are first determined, and then upper and lower boundaries are determined for any possible tables 102 that extend across only an individual text column 104. A horizontal location on the page 106 is also established for each of the possible tables 102 identified in this way based upon whether the table 102 was identified in a horizontal projection profile for the entire page 106, in which case the table 102 is centered on the page 106, or was identified in a horizontal projection profile for one of the text columns 104, in which case the table 102 is either on the left-hand or right-hand side of the page 106. Only those portions of the pixel-format document-image 24 which appear to encompass a table 102 are stored into the document-table image 36 for further processing.

Locating Tabular Data in Formatted Text

Two independent strategies are employed for locating tables 102 within a page 106 represented by data present in the text file 28. The first strategy for locating a table 102 is to scan the text of the page 106 looking for certain keywords that frequently appear in the headers of tables 102. A second strategy for locating a table 102 is based upon identifying an arrangement of text that is characteristic of components of a table 102, i.e. a grouping of blocks of text and white-space on a page 106 that occurs in tables 102.

Figure 5:
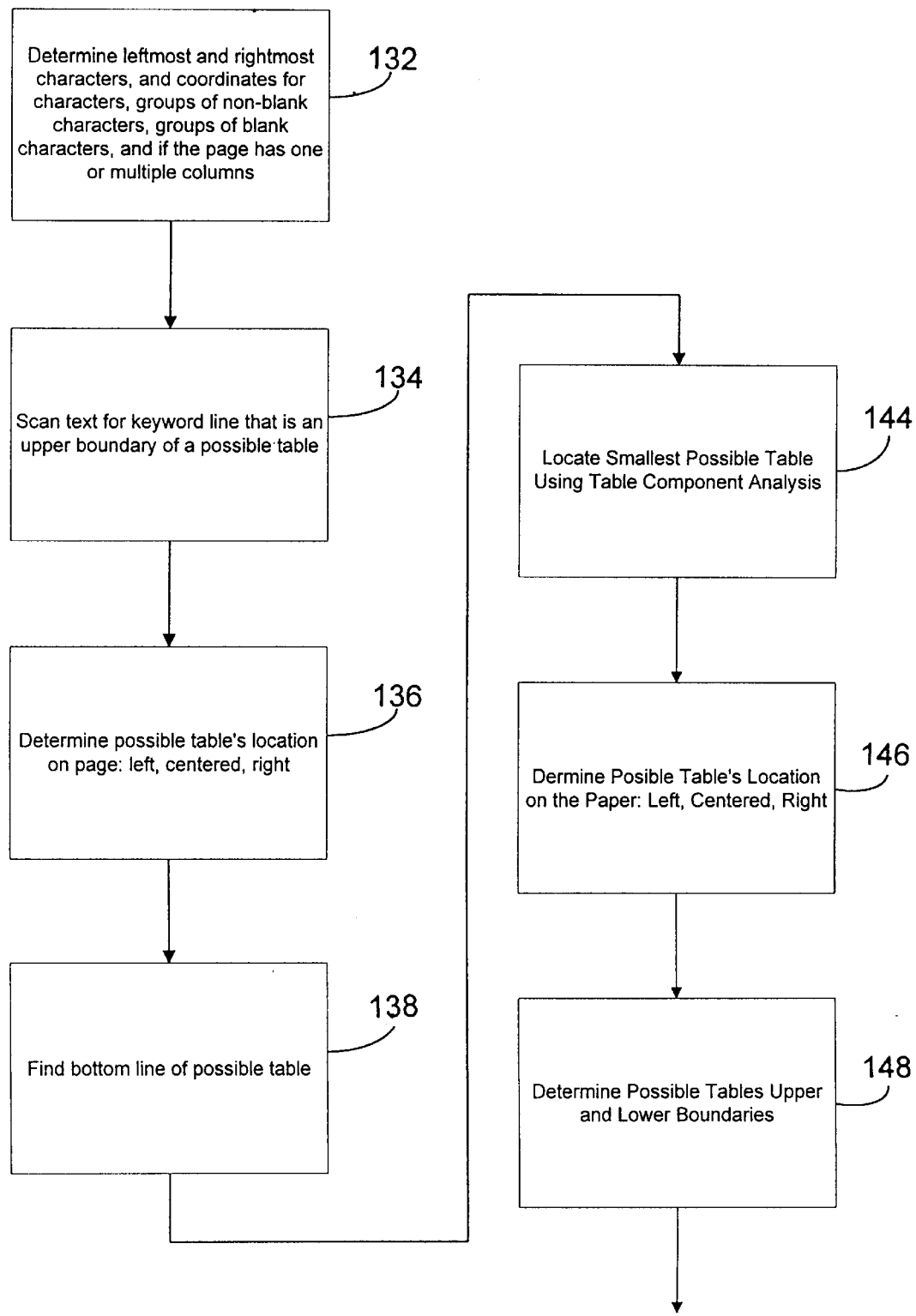
FIG. 5 is a flow diagram depicting processing steps for locating tabular data in formatted text.

However, before attempting to locate a table 102 on the page 106, as illustrated in the processing block 132 in FIG. 5 that portion of data in the text file 28 representing the page 106 is scanned to determine:

1. coordinates for the leftmost and rightmost characters on the page 106;
2. coordinates for each character on the page 106;
3. coordinates for the beginning and end of each group of non-blank characters in each text line of the page 106;
4. coordinates for the beginning and end of each group of blank characters in each text line of the page 106; and
5. if the page 106 has one or multiple text columns 104.

The presence of 2 text columns on a page 106 represented by data of the text file 28 is established if 3 blank characters occur centered horizontally at the middle of the page 106 in 15 consecutive text lines anywhere on the page 106. If such a white-space area does not occur anywhere along the center line of the page 106, then the page 106 has only a single text column 104.

Next, as depicted in processing block 134 of FIG. 5, the text in the text file 28 representing the page 106 is searched for a text line that contains a keyword, and that is an upper boundary for a possible table 102. In locating a possible table 102 by keyword searching, if either the word "table" or the word "figure" is located above a possible table 102, the keyword must be preceded by at least 5 blank characters in the same line as the keyword. Moreover, the text line containing the keyword must be immediately preceded by a text line containing only blank characters.

Having thus identified a beginning for a table, as illustrated in processing block 136 of FIG. 5, the table is then characterized as being located either on the left side of the page 106, on the right side of the page 106, or centered on the page 106. If the coordinate of the first character in the keyword is larger than one-half the width of the text on the page 106, then the possible table 102 is located on the right side of the page 106. If the possible table 102 is not located on the right side of the page 106, and if 3 blank characters occur centered horizontally at the middle of the page 106 in each of the 10 text lines immediately below the line containing the keyword, then the possible table 102 is located on the left side of the page 106. If the possible table 102 is located neither on the left side nor the right side of the page 106, then the possible table 102 is centered on the page 106.

Characterizing the possible table 102 as being located either on the left side of the page 106, centered on the page 106, or on the left side of the page 106 establishes horizontal boundaries for the possible table 102. If the possible table 102 is on the left side of the page 106, then the left boundary is the leftmost character on the page 106, and the right boundary is in the center of the page 106. If the possible table 102 is centered on the page 106, then the left boundary is the leftmost character on the page 106, and the right boundary is the rightmost character on the page 106. If the possible table 102 is on the right side of the page 106, then the left boundary is in the center of the page 106, and the right boundary is the rightmost character on the page 106.

Finding a lower boundary for a possible table 102 identified by keyword searching, as illustrated by processing block 138 in FIG. 5, requires table-format analysis of text lines immediately below the text line containing the key-word. Table-format analysis of text lines employs the concept of an "entity" which, for the purpose of locating a lower boundary of the possible table 102, is defined to be a set of non-blank characters in a text line that is bounded:

1. on the left and the right either by 2 or more space characters; or
2. the left and/or right table boundary.

Employing the preceding definition of an entity, table-format analysis classifies each text line in a possible page 106 into one of three categories:

| | |
|---|---|
| B | a text line containing only blanks |
| S | a text line containing a single entity |
| C | a text line containing multiple entities |

Each text line below the line containing the keyword is then classified in accordance with the preceding list, and the appropriate token is assigned to each line, i.e. the letter B, S or C, as depicted in FIG. 6. After all these text lines have been classified, a search is then performed to locate a lower boundary for the possible table 102. Starting at the text line immediately beneath the text line containing the keyword and continuing downward line-by-line, skip each line until encountering a blank "B" text line. If any of the token patterns listed below occur in the 4 lines immediately below the blank "B" text line, then resume searching downward for the next blank "B" text line. If none of the token patterns listed below occur in the 4 lines immediately below the blank "B" text line, then the blank "B" line is the lower boundary of the possible table 102. Set forth below are token patterns which must occur in the 4 lines immediately below a blank "B" line if the table 102 continues beneath that blank line.

| | |
|---|---|
| 1 Line Pattern | |
| C | a text line containing multiple entities |
| 2 Line Patterns | |
| B-C | a text line containing only blanks |
| | a text line containing multiple entities |
| S-C | a text line containing a single entity |
| | a text line containing multiple entities |
| 3 Line Patterns | |
| B-B-C | a text line containing only blanks |
| | a text line containing only blanks |
| | a text line containing multiple entities |
| S-S-C | a text line containing a single entity |
| | a text line containing a single entity |
| | a text line containing multiple entities |
| 4 Line Patterns | |
| B-B-B-C | a text line containing only blanks |
| | a text line containing only blanks |
| | a text line containing only blanks |
| | a text line containing multiple entities |
| S-B-S-C | a text line containing a single entity |
| | a text line containing only blanks |
| | a text line containing a single entity |
| | a text line containing multiple entities |
| S-S-S-C | a text line containing a single entity |
| | a text line containing a single entity |
| | a text line containing a single entity |
| | a text line containing multiple entities |

Regardless of whether keyword searching locates a table 102, the text file 28 representing the page 106 is also processed to locate possible tables 102 based upon identifying an arrangement of text that is characteristic of components of a tabular format. In locating a table 102 possibly present within the page 106 represented by text in the text file 28 as illustrated by processing block 144 in FIG. 5, the smallest possible table 102 is to be identified. A first test for identifying the smallest possible table 102 is to find within the text file 28:

1. the same number of groups of non-blank characters in two text lines occurring within a group of 4 consecutive text lines; and 2. the number of groups of non-blank characters in both text lines exceeds 1.

If the preceding conditions occur, then a possible table 102 has been located.

An alternative test for identifying the smallest possible table 102 is to find 2 immediately adjacent lines in a text column in which sufficiently wide white-space columns extend across the 2 immediately adjacent lines of text and between all groups of non-blank characters in both text lines. That is, for all the groups of non-blank characters in two immediately adjacent text lines, the end coordinate for one group of non-blank characters in one text line is subtracted from the beginning coordinate for the immediately successive group of non-blank characters in the immediately adjacent text line.

$$\text{beginning\_coordinate}(i+1)_j - \text{ending\_coordinate}(i)_{j\pm 1}$$

If every difference thus computed exceeds 2, then a possible table 102 has been located.

Having found a possible table 102, it is now necessary to determine its horizontal position on the page 106 as illustrated by processing block 146 in FIG. 5. That is, it is now necessary to determine if the possible table 102 is on the left-hand side of the page 106, the right-hand side of the page 106, or crosses a vertical center-line of the page 106. A horizontal location of a possible table 102 is determined by comparing the starting coordinate for both the first and last group of non-blank characters in two immediately adjacent text lines of the possible table 102. If beginning coordinates for both the first and last group of non-blank characters in the 2 immediately adjacent text lines lie either on the left-hand or on the right-hand side of the page 106, then the possible table 102 is located on that side of the page 106. However, if starting coordinates for both the first and last group of non-blank characters in 2 immediately adjacent text lines lie on opposite sides of the page 106, then the possible table 102 is centered across the page 106.

As before, characterizing the possible table 102 as being located either on the left side of the page 106, centered on the page 106, or on the left side of the page 106 establishes horizontal boundaries for the possible table 102. If the possible table 102 is on the left side of the page 106, then the left boundary is the leftmost character on the page 106, and the right boundary is in the center of the page 106. If the possible table 102 is centered on the page 106, then the left boundary is the leftmost character on the page 106, and the right boundary is the rightmost character on the page 106. If the possible table 102 is on the right side of the page 106, then the left boundary is in the center of the page 106, and the right boundary is the rightmost character on the page 106.

Having determined a horizontal position for the possible table 102, approximate upper and lower boundaries must then be determined as illustrated by processing block 148 in FIG. 5. Upper and lower boundaries for the possible table 102 are determined using the same method as described previously for keyword searching of assigning a token to each text line both above and below the smallest possible table 102, and then searching first upward and then downward until a table-terminating token sequence occurs in each direction.

If the same area on the page 106 is identified as a possible table both by keyword searching and by table component analysis, then all redundant instances of the possible table 102 are eliminated. Accordingly, possible tables 102 are identified, and upper and lower, and left and right boundaries are determined for distinct such table 102.

Extracting Tabular Data from Cells Present in Formatted Text

Having obtained an upper and lower boundary and a left and right boundary on the page 106 for a possible table 102, ASCII text initially present in the text file 28 is processed in character based cell extraction 48 illustrated in FIG. 1 to extract tabular data. Table extraction from ASCII text is much easier than from the pixel-format document-image 24 or document-table image 36 for two reasons. First, transforming the pixel-format document-image 24 or document-table image 36 into the text file 28 reduces the coordinate system from pixel coordinates to text coordinates. Although transforming the pixel-format document-image 24 or the document-table image 36 into the text file 28 is a "lossy" transforation, i.e. font sizes and graphical lines are lost, isolating lines of text and white-space in ASCII text is faster and easier than using image processing techniques such as connected component analysis and/or projection profiles. Second, the words in a possible table 102 can be analyzed for content and semantic meaning, i.e. data types and keywords can be identified. The two preceding advantages compensate to some extent for geometrical errors that occur occasionally in transforming the pixel-format document-image 24 into the text file 28.

In extracting the tabular data in character based cell extraction 48, an adaptation of techniques described in "Identifying and Understanding Tabular Material in Compound Documents," A. Laurentini and P. Viada, *Proceedings of the International Conference on Pattern Recognition*, pp. 405–409, (1992), that is incorporated herein by reference, is applied within the bounded area of the page 106 to divide the text column 104 into a Cartesian grid of basic cells, and to assign spreadsheet-like coordinates to each cell.

Figure 7:
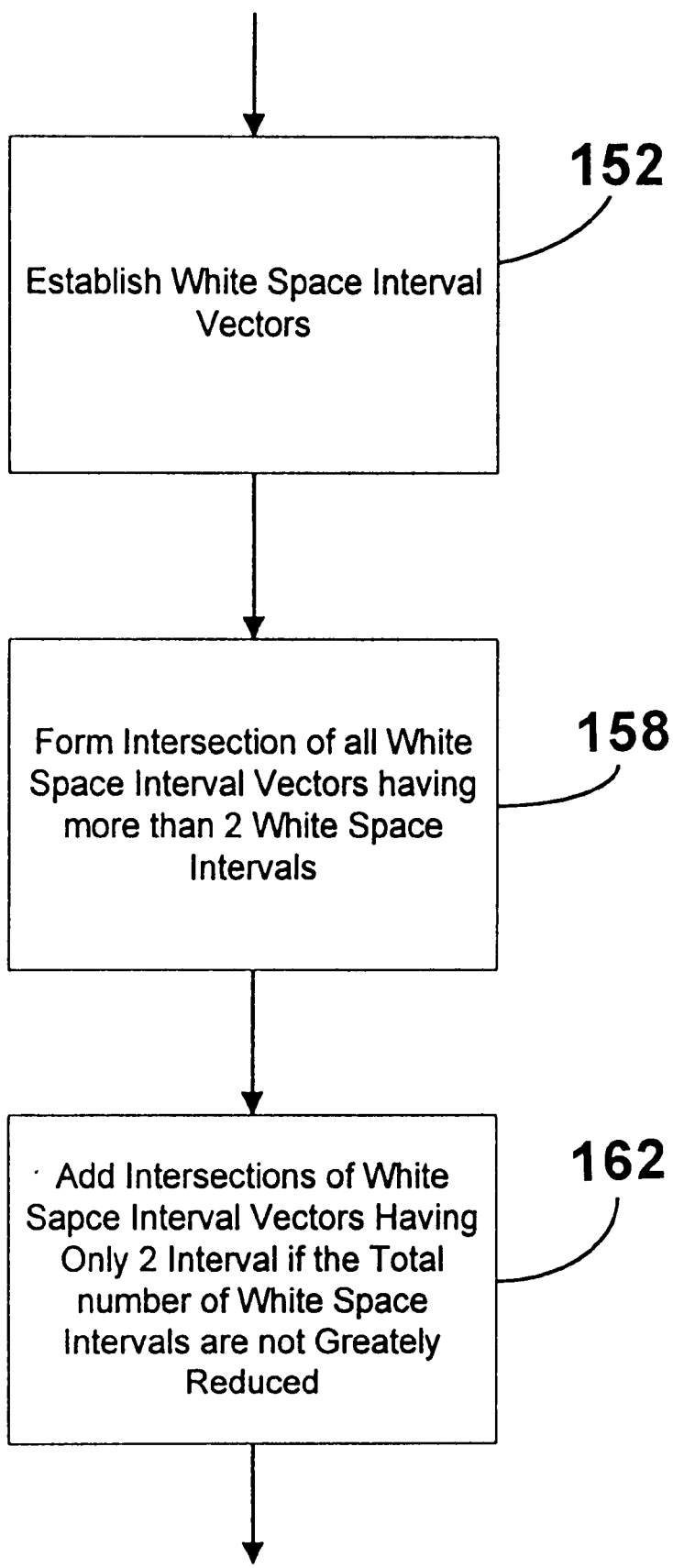
FIG. 7 is a flow diagram depicting processing steps for extracting tabular data from cells in formatted text.

Since the lines of ASCII text establish rows in the table, establishing boundaries for the cells requires only finding implied vertical separation lines between cells of the text column 104. Blank space intervals along the lines of ASCII text permit establishing "plumb lines" which extend vertically through the unruled table. To establish plumb lines 154, illustrated in FIG. 8, for each text line in the unruled table a white-space-interval vector $$R_j = \{(a_1, b_1), (a_2, b_2), \ldots, (a_n, b_n)\}$$

is evaluated in processing block 152 illustrated in FIG. 7. In evaluating each white-space-interval vector $R_j$, $a_i$ is the coordinate of the left-hand end of a white-space interval, and $b_i$ is the coordinate of the right-hand end of a white-space interval. The vectors $R_j$ illustrated in FIG. 8, are then processed to establish white-space columns 156 that extend vertically across the entire urulunruled table 102. The midpoint of each white-space column 156 is a potential plumb line 154.

To locate the plumb lines 154, the intersection of all $R_j$ having more than 2 white-space intervals is formed to establish a white-space-vector intersection, "R," as illustrated in processing block 158 of FIG. 7.

$$R = R_1 \cap R_2 \cap \ldots \cap R_n$$

The midpoint of each space interval in R represents a potential vertical plumb line 154 in the table 102.

Each $R_j$ that contains two white-space intervals can be either flow text, e.g. a header or a footer, or a text line which contains only a single table entry. For each $R_j$ having only 2 white-space intervals, the intersection of $R_j$ with R is formed to obtain an augmented white-space-vector intersection "R'."

$$R'=R \cap R_j$$

If the number of white-space intervals in R' is much smaller than the number of white-space intervals in R, then text line i contains flow text and is not to be included in R. However, if the number of intervals in R' is only slightly smaller than, or even the same as, the number of intervals in R, then R is set equal to R', and line "j" is included in the body of the table 102 as illustrated in processing block 162.

The table plumb lines identified in this way together with the horizontal text lines divides the table into a Cartesian grid of basic cells to which are assigned spreadsheet like horizontal coordinates 166 and vertical coordinates 168. ASCII strings present in each of these cells, such as those set forth below that have been abstracted from FIG. 8, constitute the tabular data.

```
Cell[0][0]: <NULL>
Cell[0][1]: <NULL>
Cell[0][2]: isotropic
Cell[1][0]: <NULL>
Cell[1][1]: <NULL>
Cell[1][2]: consolidation stress
Cell[2][0]: Void Ratio
Cell[2][1]: (e)
Cell[2][2]: p'o (kPa)
Cell[3][0]: 0.809
Cell[3][1]: <NULL>
Cell[3][2]: 384
```

Extracting Tabular Data from Cells Present in Pixel-Format Document-Images

Figure 9:
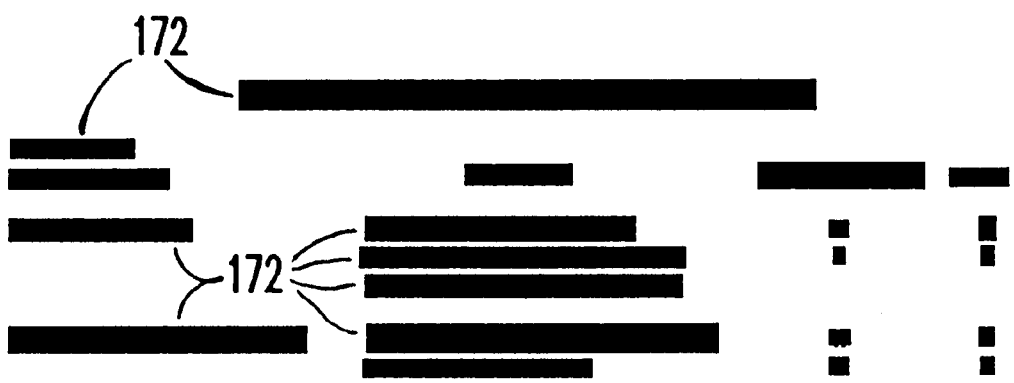
FIG. 9 depicts rectangular regions established in a pixel-format document-image using connected component analysis.

The basic strategy set forth above for extracting tabular data from cells present in the document-table text-file 42 using plumb lines 154 may also be applied to document-table image 36 to extract tabular data. In extracting tabular data from the unruled document-table image 36, as illustrated in FIG. 9, rectangular regions 172 in the unruled document-table image 36 that contain text are established using connected component analysis. Then vertical projection profiles of the rectangular regions 172 are evaluated to determine vertical plumb lines 154 extending through the white-space between the rectangular regions 172. The rectangular regions 172 and the plumb lines 154 determine cells of the unruled document-table image 36 that contain tabular data. These cells in the unruled document-table image 36 are then processed individually by the OCR 32b before storing the tabular data thus obtained into the database 46.

Storing Tabular Data into a Database

As illustrated above, the result either of the character based cell extraction 48 or of the image-based cell-extraction 44 and OCR 32b is a rectangular array of cells each one of which contains either a unique data value, or contains nothing, i.e. <NULL>. It is readily apparent to those skilled in the art that the data present in the cells illustrated above may be easily stored into a computer file in any one of a number of different formats that can be processed as input data by conventional database or spreadsheet computer programs. For example, the data in the cells may be stored into a file as tab-delimited text.

Description of Software

A computer program executed by a digital computer implements the present embodiment of the invention. Microfiche Appendix I provides a source code program listing for an implementation of this embodiment. The computer program is written in the C programming language that is well-known to those skilled in the art. The program has been demonstrated on a IBM® PC compatible digital computer. It is readily apparent to those skilled in the art that various other programming languages and/or digital computers could be used for alternative, equivalent implementations of the invention.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A processor-based method for recognizing, capturing and storing into a database file unruled tabular data of a document, the document having at least one page, the method comprising the steps of:

receiving into a digital computer digital-computer data representing a document;

processing within the digital computer the digital-computer data to locate unruled tabular data present therein;

extracting the unruled tabular data from cells present in the digital-computer data; and storing into a database file present on the digital computer the extracted tabular data.

2. The processor-based method of claim 1 wherein the digital-computer data is received as a pixel-format document-image.

3. The processor-based method of claim 2 wherein optical character recognition is performed directly on a received pixel-format document-image to obtain formatted text, and the formatted text obtained by optical character recognition is processed to locate unruled tabular data present therein.

4. The processor-based method of claim 2 wherein the pixel-format document-image is processed directly to locate unruled tabular data present therein.

5. The processor-based method of claim 4 wherein processing the pixel-format document-image directly to locate unruled tabular data present therein includes the steps of:

evaluating a horizontal projection profile of the pixel-format document-image;

determining upper and lower boundaries of a table by analyzing white space disclosed by the horizontal projection profile;

evaluating a vertical projection profile of the pixel-format document-image; and determining a horizontal location of the table by analyzing white space disclosed by the vertical projection profile.

6. The processor-based method of claim 5 wherein optical character recognition is performed to obtain formatted text of the pixel-format document-image for which upper and lower boundaries and a horizontal location have been determined, and the formatted text obtained by optical character recognition is further processed to locate unruled tabular data present therein.

7. The processor-based method of claim 5 wherein unruled tabular data located in a pixel-format document-image is extracted directly from cells present in the pixel-format document-image, and further including the step of:

before storing the tabular data into the database file present on the digital computer, performing optical character recognition on pixel-format document-images extracted from the cells to obtain the tabular data.

8. The processor-based method of claim 7 wherein extracting the unruled tabular data from cells present in the pixel-format document-image includes the steps of:

establishing regions in the pixel-format document-image using connected component analysis;

evaluating a vertical projection profile of the regions to determine plumb lines between regions; and using the regions and plumb lines, determining cells from which pixel-format document-images are extracted for optical character recognition processing.

9. The processor-based method of claim 1 wherein the digital-computer data is received as formatted text.

10. The processor-based method of claim 1 wherein the digital-computer data is formatted text present in a text file which is processed to locate unruled tabular data present therein.

11. The processor-based method of claim 10 wherein processing the formatted text to locate unruled tabular data present therein includes the steps of:

scanning the formatted text to identify a line containing a keyword;

determining that the line containing the keyword is a first horizontal boundary of a table;

determining a horizontal location of the table on the page; and determining a second horizontal boundary of the table.

12. The processor-based method of claim 11 wherein processing the formatted text to locate unruled tabular data present therein further includes the steps of:

locating a small table in the formatted text;

determining a horizontal location of the table on the page; and determining upper and lower boundaries for the table.

13. The processor-based method of claim 10 wherein processing the formatted text to locate unruled tabular data present therein includes the steps of:

locating a small table in the formatted text;

determining a horizontal location of the table on the page; and determining upper and lower boundaries for the table.

14. The processor-based method of claim 1 wherein the digital-computer data is formatted text in which unruled tabular data has been located, and the unruled tabular data is extracted from cells present in the formatted text.

15. The processor-based method of claim 14 wherein extracting unruled tabular data located in formatted text from cells present in the formatted text includes the steps of:

establishing white-space-interval vectors for all text lines in which unruled tabular data has been located; and forming a white-space-vector intersection by intersecting the white-space-interval vectors for all white-space-interval vectors having more than two white-space intervals.

16. The processor-based method of claim 15 wherein extracting unruled tabular data located in formatted text from cells present in the formatted text further includes the step of:

forming an augmented white-space-vector intersection by intersecting with the white-space-vector intersection a white-space-interval vector having only two white-space intervals; and if the augmented white-space-vector intersection has no fewer white-space intervals than the white-space-vector intersection, then replacing the white-space-vector intersection with the augmented white-space-vector intersection.

* * * * *